United States Patent [19]
Wei et al.

[11] Patent Number: 5,303,130
[45] Date of Patent: Apr. 12, 1994

[54] ILLUMINATING AUTOMOBILE SIDEVIEW MIRROR

[76] Inventors: Yung-Feng Wei, No. 9, Aly 2, Lane 32, Jen-Ai St.; Eagle Fan, No. 30, Lu-Chang, both of Chu-Pei, Hsin-Chu Hsien, Taiwan

[21] Appl. No.: 997,348

[22] Filed: Dec. 28, 1992

[51] Int. Cl.⁵ .............................................. B60Q 1/26
[52] U.S. Cl. ................................... 362/83.1; 362/80; 362/135; 362/800; 340/468
[58] Field of Search ............ 362/80, 83.1, 83.3, 362/135, 140, 134, 800, 235; 340/468, 472, 463

[56] References Cited
U.S. PATENT DOCUMENTS

| | | | |
|---|---|---|---|
| 2,010,138 | 8/1935 | Condon | 362/83.1 |
| 2,693,589 | 11/1954 | Hopkins | 362/80 |
| 4,475,100 | 10/1984 | Duh | 362/83.1 |
| 4,821,019 | 4/1989 | Taylor | 362/80 |
| 5,016,996 | 5/1991 | Ueno | 340/475 |
| 5,032,960 | 7/1991 | Katoh | 362/800 |
| 5,059,015 | 10/1991 | Tran | 340/468 |
| 5,109,214 | 4/1992 | Heidman, Jr. | 362/83.1 |
| 5,207,492 | 5/1993 | Roberts | 362/83.1 |

FOREIGN PATENT DOCUMENTS 271917 6/1927 United Kingdom .............. 362/83.1

Primary Examiner—Richard R. Cole
Assistant Examiner—Y. Quach
Attorney, Agent, or Firm—Notaro & Michalos

[57] ABSTRACT

An illuminating automobile sideview mirror comprises a plurality of illuminators mounted within the sideview mirror holder to emit light toward the rear side of the sideview mirror which is the front side of the automobile and reflective material attached to the sideview mirror holder to reflect lights projected thereon to help identify the location of the automobile.

3 Claims, 4 Drawing Sheets

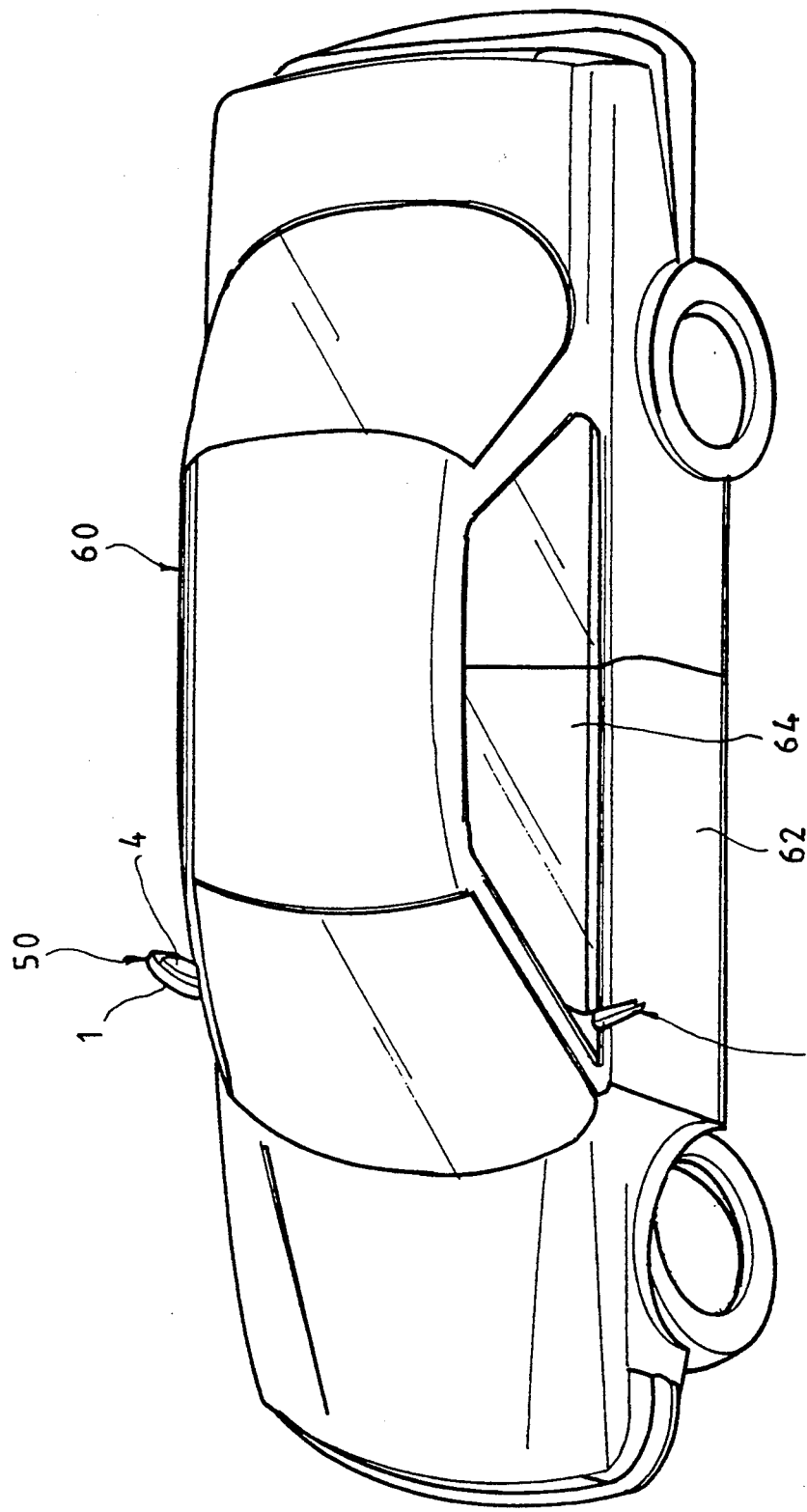

ILLUMINATING AUTOMOBILE SIDEVIEW MIRROR

FIELD OF THE INVENTION

The present invention relates generally to an automobile sideview mirror and in particular to an automobile sideview mirror with illuminators mounted thereon to provide a video signal to the coming and/or by-passing automobiles.

BACKGROUND OF THE INVENTION

Sideview mirrors are useful for automobile drivers to watch out for the rear side traffic situation. The conventional sideview mirrors are generally a flat surface mirror mounted within a holder on the blisters or on the front doors of an automobile. For some drivers, they prefer to add a small convex mirror to the flat surface sideview mirror to increase the view angle thereof.

However, no matter how the mirror is constructed, the sideview mirror assembly is in general made of an opaque and non-illuminating or light reflective material so that it may not be easy for two approaching automobiles to identify the location of each other and thus may sometimes cause accidents.

Generally, the sideview mirrors are located on the outermost sideways positions with respect to the automobile and the identification of the locations of the sideview mirrors may be helpful in determining the position of the automobile so as to avoid the occurrences of accidents.

SUMMARY OF THE INVENTION

It is therefore desirable to provide an automobile sideview mirror which comprises illuminators mounted thereon to generate a video identification for moving or stationary automobiles in order to prevent accidents caused by being unable to identify the location of the automobiles.

The principal object of the present invention is to provide an automobile sideview mirror which comprises light emitting elements thereon to give off light in order to help further identifying the location of the automobile.

It is also an object of the present invention to provide an automobile sideview mirror to which light reflective strips are attached to serve as an auxiliary illuminating device in identifying the location of the automobiles.

To achieve the above-mentioned objects, there is provided an illuminating automobile sideview mirror comprising a plurality of illuminators mounted within the sideview mirror holder to emit light toward the rear side of the sideview mirror which is the front side of the automobile and reflective material attached to the sideview mirror holder to reflect lights projected thereon to help identify the location of the automobile.

BRIEF DESCRIPTION OF THE DRAWINGS

The above and other objects and advantages of the present invention will be readily apparent from the following description of a preferred embodiment taken in connection with the accompanying drawings, wherein:

FIG. 4 is a perspective view showing an automobile on which the illuminating sideview mirrors assembly made in accordance with the present invention are mounted in the vicinity of the front door windows thereof.

DETAILED DESCRIPTION OF THE PREFERRED EMBODIMENTS

Figure 1:
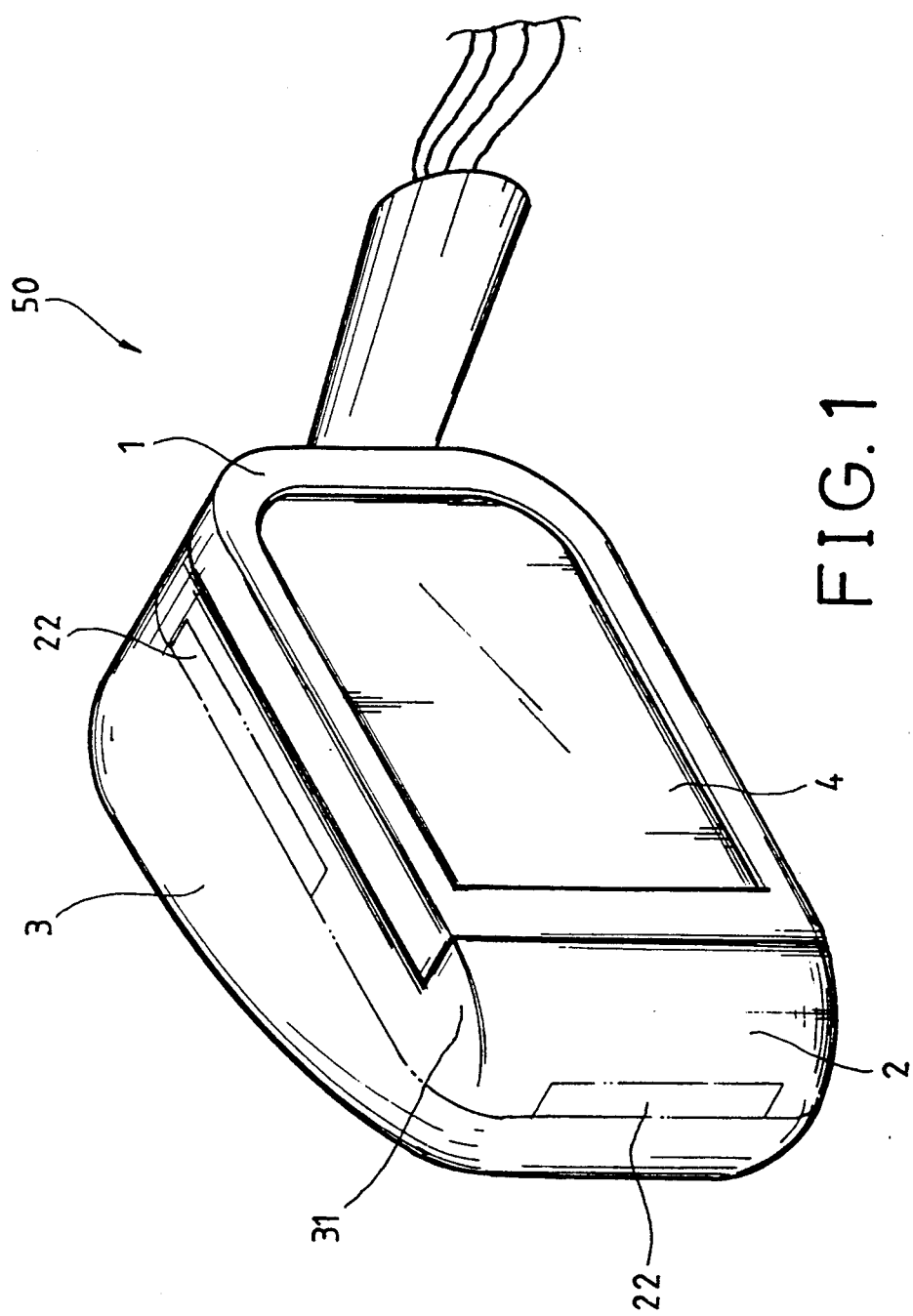
FIG. 1 is a perspective view of an illuminating automobile sideview mirror assembly made in accordance with the present invention.

With reference to the drawings and in particular to FIG. 1, wherein an illuminating automobile sideview mirror assembly made in accordance with the present invention, generally designated with reference numeral 50, is shown, the illuminating automobile sideview mirror assembly 50 comprises a mirror holder 1 which is generally disposed on a front door 62 of a automobile 60 (see FIG. 4) close to the front door window 64 in order to be readily adjusted by the driver (not explicitly shown on the drawings) of the automobile 60.

Figure 2:
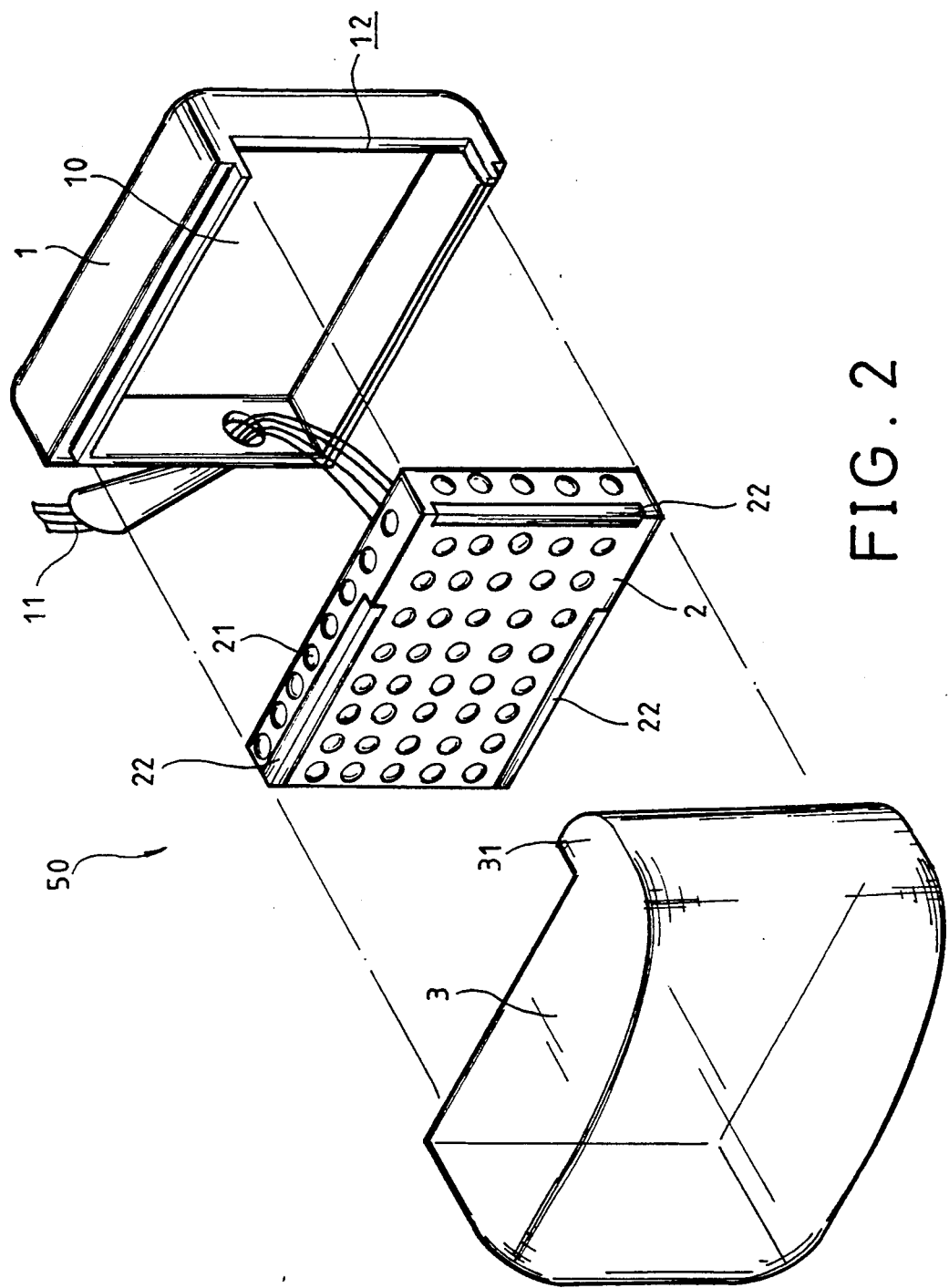
FIG. 2 is an exploded fragmentary view of the illuminating sideview mirror assembly shown in FIG. 1.
Figure 3:
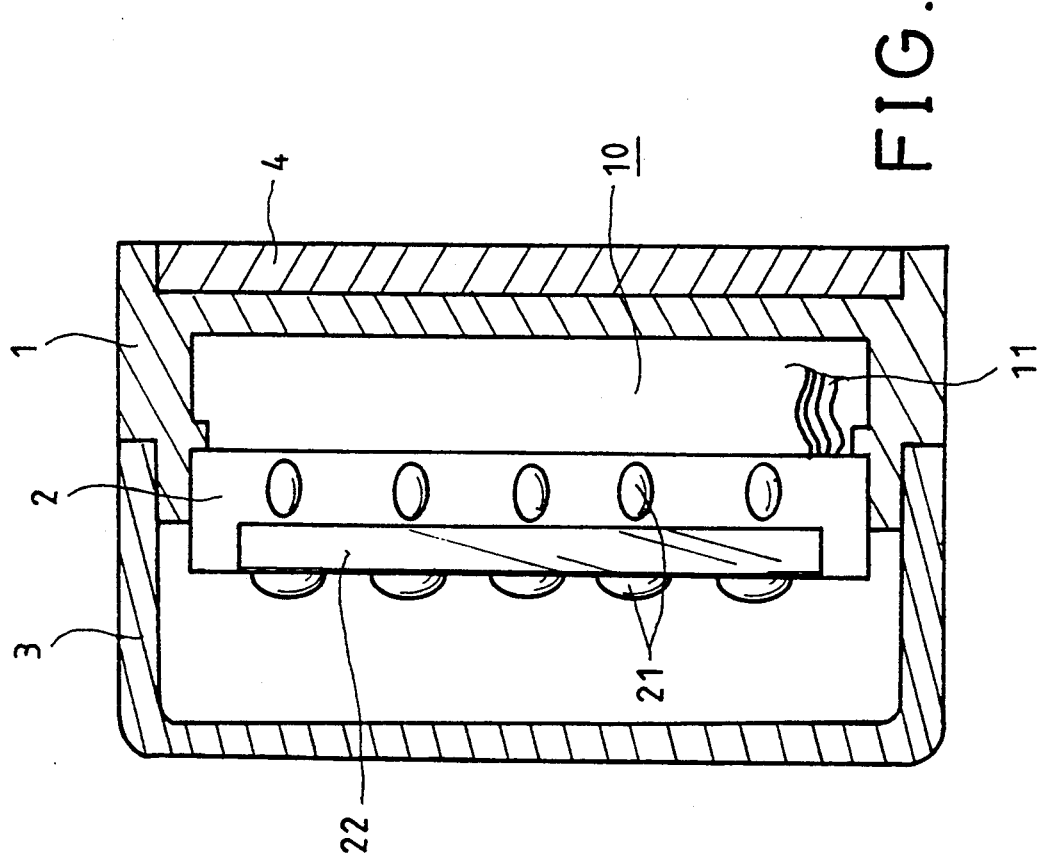
FIG. 3 is a lateral sectional view showing the interior structure of the illuminating sideview mirror assembly shown in FIGS. 1 and 2.

Further referring to FIGS. 2 and 3, a mirror, preferably a flat surface mirror 4, is mounted on a front surface of the mirror holder 1 to function as a conventional automobile sideview mirror. Formed on a rear surface, which is opposite to the front surface of the mirror holder 1, is a recess 10 on which a transparent cover 3 is provided to house the recess 10 and thus defining therein an interior space which is also designated with the same reference 10 as the recess formed on the rear surface of the mirror holder 1.

Mounted inside the interior space 10 is an illuminator means 2 in which a plurality of illuminators 21 are secured. Preferably, the illuminators 21 are light emitting diodes (LEDs) in order to provide a soft light with a less consumption of electrical energy. Wires 11 which extend from the front door 62 of the automobile 60 and are in electrical connection with the automobile electricity system (not shown) are connected to the LEDs 21 to supply electrical energy thereto. Since the arrangement of the power wires 11 is well known to the automobile electricians, no detail is needed herein.

Preferably, the illuminator means 2 comprises a portion extending out of the lateral side of the mirror holder 1 to provide a better way of emitting light to the lateral side and rear side of the automobile 60. The extension of the illuminator means 2 may be done by providing a notched portion 12 on the rear side of the mirror holder 1 to allow the illuminator means 2 which is embedded in the rear side recess 10 of the mirror holder 1 to extend therethrough. Accordingly, the transparent cover 3 comprises a lateral extension 31, which is preferably in an arcuated connection with the cover 3, to cover the lateral extension of the illuminator means 2.

Preferably, the LEDs 21 are mounted on all sides of the illuminator means 2 which are exposed to human eyes through the transparent cover 3 when looked at from the exterior of the automobile 60.

Light reflective materials, preferably in the form of reflective strips 22, are attached on the illuminator means 2 to provide reflection of the light projected thereon. In the embodiment shown in the drawings, the illuminator means 2 is a block-shaped member complementary in shape and size to the rear recess 10 of the mirror holder 1 to be received therein. On the exposed sides of the illuminator means 2, including the top side, the bottom side, the lateral side opposite to the front door 62 of the automobile 60 and the rear surface opposite to the mirror 4, as viewed in the drawings, the LEDs 21 are evenly distributed. The reflective strips 22 may then be attached to the connecting corners between these exposed sides.

The securing of the transparent cover 3 to the mirror holder 1 may be done in any known ways, such as screws or adhesion. This is known to those skilled in the art and no detail will be given herein.

It can be understood that if the illuminators of the sideview mirrors of the present invention are in connection with the controller of the directional signal lamps of the automobile 60, they can also serve as auxiliary directional signal devices.

It is apparent that although the invention has been described in connection with the preferred embodiments, it is contemplated that those skilled in the art may make changes to certain features of the preferred embodiment without altering the basic concept of the invention and without departing from the spirit and scope of the invention as defined in the . appended claims.

What is claimed:

1. An illuminating automobile sideview mirror assembly comprising a mirror holder which is secured on an automobile having an electricity system, said holder having a front surface on which a mirror is mounted and a rear surface opposite to said front surface on which a recess is formed, a transparent cover being mounted on said recess to house the recess and defining therein an interior space to receive therein an illuminator means, said illuminator means comprising a plurality of illuminators secured thereon for projecting light through said transparent cover, said illuminator means further comrpising light reflective materials attached thereto to reflect light projected thereon through said transparent cover, said illuminator means further comprising a block-shaped member complemental in shape and size to said recess to be received therein and having an extended portion thereof extending out of said recess from a lateral side of said sideview mirror assembly away from said automobile and wherein said cover comprises an extension to cover the extended portion of said illuminator means, said illuminator means further comprising a top side, a bottom side, a surface opposite to said mirror, and a lateral side away from the automobile which are exposed through said transparent cover, said plurality of illuminators being evenly distributed on said exposed sides and surface of the illuminator means and said reflective materials being attached to connecting corners between said exposed sides and surface of the illuminator means.

2. An illuminating automobile sideview mirror assembly as claimed in claim 6, wherein said illuminators comprise light emitting diodes in electrical connection with the electricity system to emit light upon receiving electrical power from the electricity system.

3. An illuminating automobile sideview mirror assembly as claimed in claim 1, wherein said reflective materials comprise a plurality of light reflective strips attached to said illuminator means.

* * * * *